United States Patent [19]
Verinsky et al.

[11] Patent Number: 5,535,327
[45] Date of Patent: Jul. 9, 1996

[54] METHOD AND APPARATUS FOR COMMUNICATING FORMATTED DATA FROM A MASS STORAGE DEVICE TO A HOST COMPUTER

[75] Inventors: Phil Verinsky; Gene Weddle, both of San Jose, Calif.

[73] Assignee: Oak Technology, Inc., Sunnyvale, Calif.

[21] Appl. No.: 505,557

[22] Filed: Jul. 21, 1995

Related U.S. Application Data

[63] Continuation-in-part of Ser. No. 264,600, Jun. 23, 1994.
[51] Int. Cl.$^6$ .............................. G06F 11/10; G06F 3/08; G11B 21/10
[52] U.S. Cl. ................... 395/182.03; 395/182.16; 371/40.1; 371/37.7
[58] Field of Search ..................... 395/182.03, 182.01, 395/182.16; 371/30, 37.7, 40.1

[56] References Cited

U.S. PATENT DOCUMENTS

| | | | |
|---|---|---|---|
| Re. 33,462 | 11/1990 | Suzuki et al. | 371/37.5 |
| 4,698,810 | 10/1987 | Fukuda | 371/38 |
| 4,800,550 | 1/1989 | Yamauchi | 369/59 |
| 4,802,152 | 1/1989 | Markvoort et al. | 369/32 |
| 4,843,484 | 6/1989 | Kanamaru et al. | 358/342 |

OTHER PUBLICATIONS

Sanyo LC8950 & LC8951 Real-Time Error Correction and Host Interface Professors for CD-I and CD-ROM Applications (Application Note Number E89), published by Sanyo Electric Co., Ltd. (Semiconductor Division), 1989.
X3T9 (I/O Interface) ATA Draft Proposed Standard, published by American National Standards Institute, Feb. 10, 1992.
Fricks, Compact Disc Terminology, published by Disk Manufacturing, Inc., 1992.

*Primary Examiner*—Robert W. Beausoliel, Jr.
*Assistant Examiner*—Alan M. Fisch
*Attorney, Agent, or Firm*—Ray K. Shahani; Patrick Reilly; Jeffrey P. Aiello

[57] ABSTRACT

A method to and apparatus for communicating formatted data from mass storage media to a host computer is disclosed. In a preferred embodiment data is received through a serial digital signal processor (DSP) from an optical compact disk. The method and apparatus separates data bytes from auxiliary bytes, and stores them into separate and specific spaces within a DRAM. Error correction is performed after each block of data has been stored. After a given block has been verified, the system controller records the block number. The method and apparatus reduces the amount of address storage required to locate valid blocks of data in the DRAM. The method of the present invention increases the effective rate of transfer of data from the DRAM to a host computer.

9 Claims, 5 Drawing Sheets

METHOD AND APPARATUS FOR COMMUNICATING FORMATTED DATA FROM A MASS STORAGE DEVICE TO A HOST COMPUTER

This application is a continuation in part of co-pending new patent application Ser. No. 08/264,600 filed Jun. 23, 1994 which is incorporated herein, in ifs entirety, by reference.

BACKGROUND OF THE INVENTION

1. Field of the Invention

The present invention relates to methods used to read large volumes of highly formatted data from a mass storage media, and more particularly, to a method and apparatus for communicating error corrected and verified data from a mass media storage device to a host computer.

2. Description of Prior Art

Personal computer and workstation architectures have been increasing both in sophistication and capability. The recent affordability and availability of mass storage peripheral devices, such as hard drives and optical compact disks, has greatly increased the range of applications in which personal computers and workstations can be efficiently used. The retrieval of data by a host computer from a mass storage device requires the implementation of a hardware drive and a software driver. The hardware drive typically includes a spindle, drive electronics and a controller. The drive electronics recovers data from an optical or magnetic disk as directed by the controller. The controller manages the transfer of the data, to include error correction operations, to the host computer.

The transportability of compact optical disks, referred to herein as a compact disk, or CD, is viewed as a major advantage of CD technology (as compared with magnetic hard disk media) by the marketplace. The hardware drive for an optical compact disk is therefore usually designed with a load mechanism, that allows for compact disks to be frequently loaded and unloaded.

The Compact Disk industry has established several data formatting standards that are in wide use today. The conventional methods used to provide efficient and reliable access of data from CDs by personal computers and workstations clearly illustrate the state of prior art related to the present invention. The complexity of managing the transfer of data stored in varying formats will be evident from an overview of the current state of CD data protocols.

The Compact Disk Digital Audio Standard was originally introduced by Philips and Sony for use with audio recording products. This standard, also known as the Red Book Standard, is used today in all consumer audio compact disk players. The Red Book Standard is the original template from which all consumer CD standards have been based.

Most CDs are divided into sectors of 3234 eight-bit bytes. A data sector stored in Red Book format consists of 2352 bits of audio data, 784 bytes of error correction and detection code, and 98 bytes of control data.

Philips and Sony later defined a Yellowbook standard for use with CD read only memory (CD-ROM). The Yellow Book, or CD-ROM, standard has two distinct modes. In Mode 1, the Red Book data field of 2352 bytes is further specified to include 12 Sync bytes, 4 Header bytes, 2048 User Data bytes, 4 Error Detection and Correction (EDC) bytes, 8 blank bytes, and 276 Error Correction Code (ECC) bytes. Mode 2 redefines the 2352 data bytes into 12 Sync bytes, 4 Header bytes, and 2336 User Data bytes. Both Mode 1 and Mode 2 have the additional EDC, ECC and control bytes as specified by the earlier Red Book standard. (These additional Red Book EDC/ECC and Control bytes are often referred to as comprising a first and second layer.)

In addition to the three formats described above, the compact disk industry also uses the CD-ROM Mode 2, XA Format and CD-I (Green Book) standards. The CD-ROM Mode 2, XA Format is an extension of the Yellow Book standard and defines two distinct forms. CD-ROM Mode 2, XA Format, Form 1 is used for computer data. CD-ROM Mode 2, XA Format, Form 2 is used for compressed audio data and video/picture data. Mode 2 further defines two distinct forms. CD-ROM Mode 2, XA Format Form 1 is used for computer data. This XA Form 1 format consists of 12 Sync bytes, 4 Header bytes, 8 Sub-Header bytes, 2048 User Data bytes, 4 EDC bytes, 276 ECC bytes, and the additional Red Book first and second layer EDC/ECC and Control bytes.

The XA Form 2 format consists of 12 Sync bytes, 4 Header bytes, 8 Sub-Header bytes, 2324 User Data bytes, 4 EDC bytes and the additional Red Book first and second layer EDC/ECC and Control bytes.

The CD-I, or Green Book, standard is specified within the CD-ROM Mode 2, XA Format convention. Green Book format includes is specified to comprise 12 Sync bytes, 4 Header bytes, 8 Sub-Header bytes, 2324 User Data bytes and 4 EDC bytes. Green Book Form 1 is used for computer data and contains third layer (Red Book) EDC/ECC bytes. Green Book Form 2 is used for compressed audio and video/picture data. This Form 2 does not include third layer EDC/ECC (Red Book) bytes.

It is not uncommon for a given CD to be used in mixed mode, where data is stored in more than one format. A typical example would include a first track in Yellow Book, CD-ROM Mode 1, and all remaining tracks in Red Book (audio) format. Although the CD drive electronics can read only one track at a time, the CD drive controller must still be able to receive data in a number of significantly different formats, perform error correction, and retransmit the validated data to a host computer.

The conventional methods of CD drive controller operations use a sequential technique where all data incoming from a CD is simply stored in consecutive memory locations. With these methods, the controller must track the starting address and length of each data block by sector and by type. This especially true for successful completion of ECC and EDC error correction operations.

If only the corrected User Data is to be transmitted to the host computer, the starting address of each DSP block must be stored by the system controller of the host computer, and this starting address must be read by the system controller when the host computer is ready to receive a new block of data.

SUMMARY OF THE INVENTION

It is an object of the present invention to provide a method and apparatus for transferring formatted data from a mass storage source to a host computer. In a preferred embodiment, the method of the present invention allows for the transfer of data from a CD-ROM to a personal computer. Serial data from the digital signal processor (DSP) is received by a CD-ROM drive controller circuit after retrieval from a CD through a DSP interface logic circuit.

The data is separated into user data and auxiliary data and stored in a DRAM. User data is stored in contiguous blocks in one specified section of the DRAM, and all other auxiliary data (e.g. EDC, ECC, Header, Sub-Header) is stored in a separate distinct section within the DRAM. (The term auxiliary data refers to all data received from a CD which is not user data, to include ECC, EDC, Header, Sub-Header, Sync and Control data types.)

After a complete block of DSP data is read into the DRAM, error detection and correction operations are performed by an error correction and detection (ECC and EDC) circuitry. If an error is detected, the erroneous data is corrected and written back into the DRAM. When a block of user data has been verified to be correct, then the whole block or a fraction will be transferred to the host computer. The addressing for this transfer is accomplished by the system controller writing a block number to the host address counters. Using the method of the present invention only the block number of each user data block needs to be stored and later read by the system controller. This method reduces the amount of address storage required to locate valid data blocks in DRAM and reduces the execution time required by the system controller to address each user data block from the DRAM through the CD-ROM drive controller and to the host computer.

In an alternate embodiment of the method of the present invention, the DRAM address space segmented for use in storing auxiliary data is limited to hold only two separate auxiliary data blocks. This alternate embodiment frees up a larger address space for user data storage, which increases the effective DRAM buffer capacity. This technique is feasible in part because the auxiliary data block corresponding to a specific user data block can be erased once all EDC and ECC operations have been completed on the specified user data block. Thus it is only necessary to allocate space in the DRAM into two auxiliary data blocks, one for the DSP to write in-coming data to, and one for the ECC to use for error correction of the last complete block.

The following specific embodiments are contemplated, disclosed and claimed herein:

1. A method of communicating a plurality of sectors of digital user data, using a plurality of sectors of auxiliary data, from a mass storage device to a host computer comprising the following steps: (a) reading a sector of data; (b) separating the user data and the auxiliary data; (c) storing the user data in a first contiguous block of memory within a digital memory device; (d) storing the auxiliary data in a second contiguous block of memory within the digital memory device; (e) performing and completing error detection and correction operations on the user data stored within the digital memory device; (f) labelling the error corrected user data block with a block address; (g) repeating steps (a) through (f) using a different label for each error corrected data block until all sectors of data desired from the mass storage device have been read, separated into user data and auxiliary data and the user data has been error corrected; and (h) transferring the error corrected user data, as desired, over a communications bus to the host computer.

2. This method can also be performed such that during each step (d) the auxiliary data read out from the sector of data is stored within the digital memory device, thereby replacing a portion of the auxiliary data previously stored in the second contiguous block of memory within the digital memory device. This method in turn can be performed such that auxiliary data from at most two sectors of digital data is stored at any one time in the second contiguous block of memory within the digital memory device.

3 and 4. In either of these methods, if the user data comprises more than 2048 bytes of digital data it is not stored in a single contiguous block within the digital memory device, but rather is stored in a plurality of noncontiguous blocks within the digital memory device.

5. A method for communicating digital data from a mass storage device involving the management of storage of raw data and auxiliary data is disclosed and claimed herein, the method comprising the following steps: (a) transmitting digital data from a mass storage device to a digital signal processor (DSP); (b) generating serial strings of DSP data in byte format, each of the strings of DSP data comprising a raw data block with a predetermined number of raw data bytes and an associated auxiliary data block, the auxiliary data block comprising synchronization data bits and ECC/EDC data bits; (c) separating each of the data strings into a raw data block and an associated auxiliary data block; (d) separately and sequentially storing the raw data block into a first contiguous section of a first dedicated portion of a digital memory device, the location of the first byte of the raw data block identified by a first starting address; (e) separately and sequentially storing the associated auxiliary data block into a first contiguous and associated section of a second dedicated portion of the digital memory device, the location of the first byte of the associated auxiliary data block identified by a first starting address; (f) generating a first phase block number, whereby the first phase block number uniquely identifies the first starting address of a first byte of the raw data block and the first starting address of a first byte of the associated auxiliary data block; (g) generating a first phase address count, whereby the first phase address count is an integer value indicating the predetermined number of bytes of raw data contained in the raw data block; (h) communicating the raw data block and the associated auxiliary data block from the digital memory device to EDC and ECC circuitry; (i) performing EDC and ECC operations on the raw data block in accordance with information contained in the associated auxiliary data block, whereby the raw data block is checked for data errors, and values found in the raw data block are confirmed, corrected or ignored as determined by the application of data error correction and detection algorithms; (j) generating a corrected data block; (k) transmitting the corrected data block to the digital memory device; (l) generating a second phase block number, whereby the second phase block number uniquely identifies a first starting address of a first byte of the corrected data block; (m) generating a second phase address count, whereby the second phase address count is an integer value indicating a number of bytes of corrected data contained in the corrected data block; (n) repeating steps (a) through (m) generating successive corrected data blocks until all sectors of data desired from the mass storage device have been read, separated into user data and auxiliary data and the user data has been error corrected; (o) informing a system controller that the corrected user data block is available for transmission; (p) communicating the second phase block number and the second phase address count to the system controller; and (q) transmitting the corrected data block over a communications bus to a host computer.

6. A method for communicating digital data from a mass storage device involving the management of storage of raw data and auxiliary data is disclosed and claimed herein, the method comprising the following steps: (a) transmitting digital data from a mass storage device to a digital signal processor (DSP); (b) generating serial strings of DSP data in byte format, each of the strings of DSP data comprising a raw data block with a predetermined number of raw data bytes and an associated auxiliary data block, the auxiliary data block comprising synchronization data bits and ECC/EDC data bits; (c) separating each of the data strings into a raw data block and an associated auxiliary data block, the raw data block having the predetermined number of raw data bytes; (d) separately and sequentially storing the raw data block containing a number of the raw data bytes, the number equivalent to a predetermined number of byte memory locations, into a first contiguous section of a first dedicated portion of a digital memory device, the first dedicated portion of the digital memory device having a plurality of contiguous sections, the first contiguous section of the first dedicated portion of the digital memory device having the same predetermined number of byte memory locations; (e) separately and sequentially storing the associated auxiliary data block containing a number of associated auxiliary data bytes, the number equivalent to a predetermined number of byte memory locations, into a first contiguous section of a second dedicated portion of the digital memory device, the second dedicated portion of the digital memory device having a plurality of contiguous sections, the first contiguous section of the second dedicated portion of the digital memory device having the same predetermined number of byte memory locations; (f) separately and sequentially storing an additional raw data block containing any additional raw data bytes into a first contiguous associated section of a third dedicated portion of the digital memory device; (g) generating a first phase block number, whereby the first phase block number uniquely identifies a first starting address of a first byte of the raw data block and of the additional raw data block, and whereby the first phase block number also identifies a first starting address of a first byte of the associated auxiliary data block; (h) generating a first phase address count, whereby the first phase address count is an integer value indicating the predetermined number of bytes of raw data contained in the raw data block and in the additional raw data block; (i) communicating the raw data block, the additional raw data block and the associated auxiliary data block from the digital memory device to EDC and ECC circuitry; (j) performing EDC and ECC operations on the raw data block and the additional raw data block in accordance with information contained in the associated auxiliary data block, whereby the raw data block and the additional raw data block are checked for data errors, and values found in the raw data block and in the additional raw data block are confirmed, corrected or ignored as determined by the application of data error correction and detection algorithms; (k) generating a corrected data block and an additional corrected raw data block; (l) transmitting the corrected data block and the additional corrected raw data block to the digital memory device; (m) generating a second phase block number, whereby the second phase block number uniquely identifies a first starting address of a first byte of the corrected data block and of the additional corrected data block; (n) generating a second phase address count, whereby the second phase address count is an integer value indicating a number of bytes of corrected data contained in the corrected data block and in the additional corrected data block; (o) repeating steps (a) through (n) generating successive corrected data blocks until all sectors of data desired from the mass storage device have been read, separated into user data and auxiliary data and the user data has been error corrected; (p) informing a system controller that the corrected data block and the additional corrected data block is available for transmission; (q) communicating the second phase block number and the second phase address count to the system controller; and (r) transmitting the corrected data block and the additional corrected data block over a communications bus to a host computer.

7. In an embodiment of the preceding invention, following step (i), the associated auxiliary data block in the second dedicated portion of the digital memory device is written over by a subsequently produced associated auxiliary data block such that said digital memory device is available to store an increased number of raw user data blocks or of corrected data blocks.

8. In an embodiment of the preceding invention, following step (j), the associated auxiliary data block in the second dedicated portion of the digital memory device is written over by a subsequently produced associated auxiliary data block such that the digital memory device is available to store an increased number of raw user data blocks, of additional raw data blocks, of corrected data blocks or of additional corrected data blocks.

9 and 10. The methods of either of the two preceding embodiments of the present invention can be performed storing at most two associated auxiliary data blocks into the digital memory device, one of which would be produced or would be in the process of being produced by the DSP of step (a) and one of which would be used or would be in the process of being used for the EDC and ECC operations of step (i) or (j).

11 and 12. The methods of paragraphs 5 and 6, above, wherein the predetermined number of raw data bytes is 2048.

13. The method of paragraph 6, above, wherein an additional associated auxiliary data block is stored separately and sequentially following step (f), and utilized thereafter in performing EDC and ECC operations, as a consequence of having a number of associated auxiliary data bytes corresponding to the predetermined number of raw data bytes in the raw data block.

14. A method for communicating formatted data from a mass storage device to a host computer comprising the following steps: a) sequentially receiving a multiplicity of formatted data sectors from the mass storage device, each of the formatted data sectors comprising a user data section and an auxiliary data section, the auxiliary data section further comprising at least an EDC data field and an ECC data field; (b) defining a user data storage area and an auxiliary data storage area within a memory device; (c) defining the user data storage area to comprise a multiplicity of user data storage blocks, each of the user data storage blocks for storing one of the user data sections, and the multiplicity of user data blocks organized sequentially in the user data storage area, each of the multiplicity of user data storage blocks further comprising a first data storage block; (d) defining the auxiliary data storage area to comprise a multiplicity of auxiliary data storage blocks, each of the auxiliary data storage blocks for storing one of the auxiliary data sections, and the multiplicity of auxiliary data blocks organized sequentially in the auxiliary data storage area, each of the multiplicity of auxiliary data storage blocks further comprising a first auxiliary storage block; (e) sequentially separating each of the multiplicity of formatted data sectors into a user data section and an auxiliary data section; (f) subsequently storing each of the multiplicity of user data blocks in the sequentially organized data storage blocks; and (g) storing each of the multiplicity of the auxiliary data sections in the sequentially organized auxiliary data storage block.

15. The method of the immediately preceding paragraph, further comprising the steps of: (h) transmitting the EDC data field and the ECC data field of the auxiliary data section from the first auxiliary data block to an EDC and ECC circuit; (i) transmitting the user data section from the first user data block to the EDC and ECC circuit; (j) performing EDC and ECC operations on the user data section; and (k) transmitting the resultant corrected data of step l to the first user data storage block.

16. The method of the immediately preceding paragrah, further comprising the steps of: (l) generating a first block number, the first block number indicating the starting address of the first user data storage block; (m) transmitting the first block number to the host computer; (n) transmitting the contents of the first user data storage block to the host computer and on the command of the host computer by means of the host computer communicating the first block number whereby the starting address of the first user data storage block is specified.

17. A method for communicating formatted data from a mass storage device to a host computer comprising the following steps: (a) defining a user data storage area and an auxiliary data storage area within a memory device; (b) defining the user data storage area to comprise a multiplicity of user data storage blocks, each of the user data storage blocks defined to be of equal length and organized sequentially within the user data storage area; (c) defining the auxiliary data storage area to comprise at least a first auxiliary data storage block and a last auxiliary data storage block, each of the auxiliary data storage blocks defined to be of equal length and organized sequentially within the auxiliary data storage area; (d) sequentially receiving a multiplicity of formatted data sectors from the mass storage device, each of the formatted data sectors comprising at least a user data section and an auxiliary data section, each of the auxiliary data sections further comprising at least an EDC data field and an ECC data field; (e) receiving a first formatted data sector, and storing the first formatted data sector's user data section in a first user data storage block, and storing the first formatted data sector's auxiliary data section in the first auxiliary data storage block; (f) performing EDC and ECC operations on the first formatted data sector's user data section, and storing the results of the EDC and ECC operations in the first user data storage block; (g) receiving a subsequent formatted data sector, and storing the subsequent formatted data sector's user data section in a subsequent user data storage block, and storing the subsequent formatted data sector's auxiliary data section in a subsequent auxiliary data storage block; (h) performing EDC and ECC operations on the subsequent formatted data sector's user data section, and storing the results of the EDC and ECC operations in the subsequent user data storage block; (i) sequentially repeating steps (h) and (i) until all of the auxiliary data storage blocks have an auxiliary data section stored therein; (j) receiving a subsequent formatted data sector, and storing the subsequent formatted data sector's user data section in a subsequent user data storage block, and storing the subsequent formatted data sector's auxiliary data section in the first auxiliary data storage block, thereby overwriting any previous auxiliary data section stored therein; (k) performing EDC and ECC operations on the subsequent formatted data sector's user data section, and storing the results of the EDC and ECC operations in the subsequent user data storage block; (l) sequentially repeating steps (h) and (i), overwriting any previous auxiliary data section stored in the subsequent auxiliary data storage block when performing step (h), until all of the auxiliary data storage blocks have stored therein an auxiliary data section.

DETAILED DESCRIPTION OF THE PREFERRED EMBODIMENT

The following detailed description of the present invention is meant to be illustrative only and not limiting. Other embodiments of this invention will be obvious to those skilled in the art in view of the following disclosure.

Figure 1:
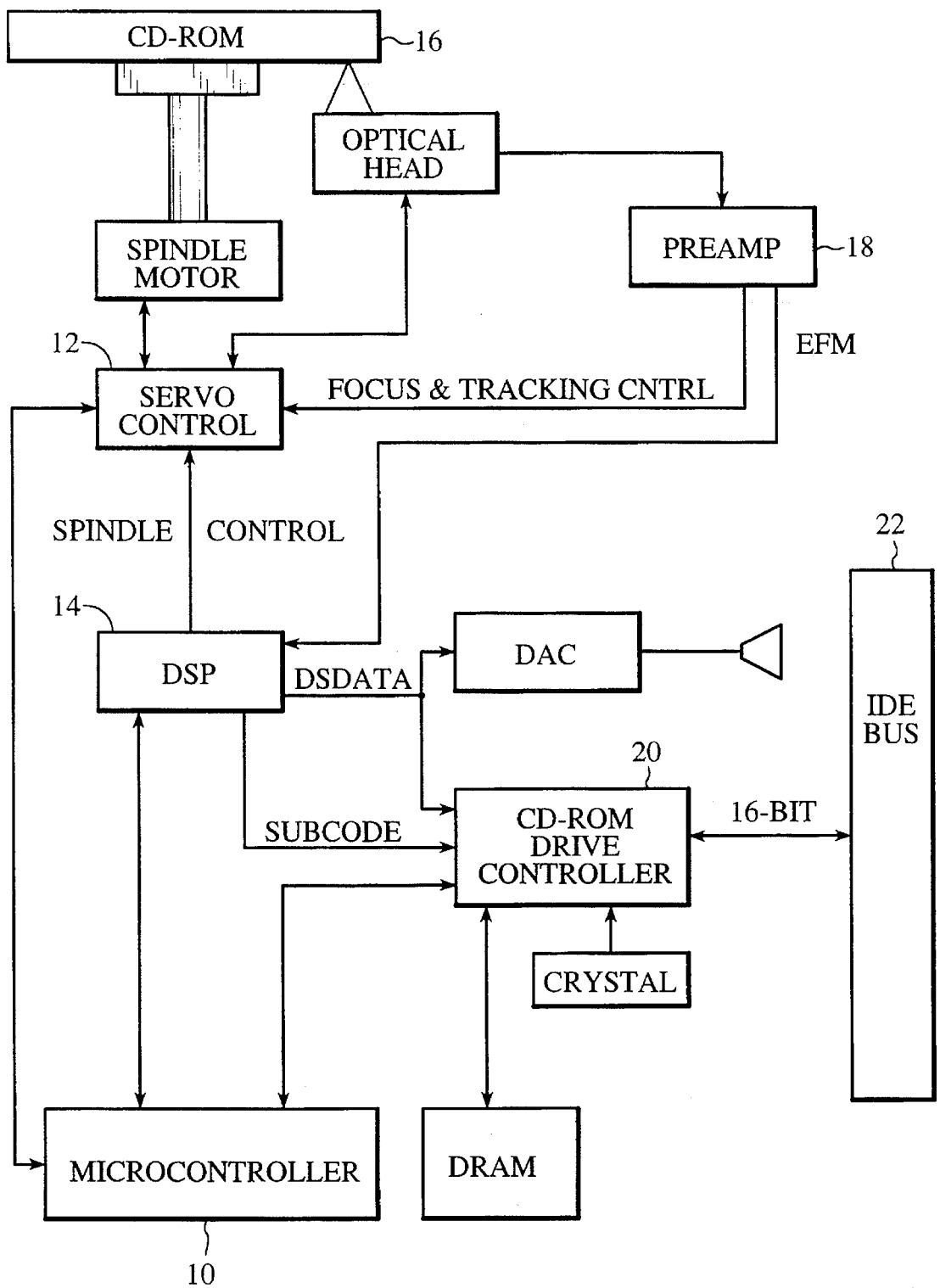
FIG. 1 shows a CD drive electronics circuit.

FIG. 1 illustrates a particular architecture of electronic circuitry for transmitting data from a compact disk-read only memory device (CD-ROM) 16 to a host computer via an IDE data bus 22. It is helpful to explain the essential function of a CD drive controller in order to best describe the method of the present invention as embodied in the following example. Microcontroller controls the operations of servo control 12 and DSP 14. The DSP receives data and subcode from the CD-ROM 16 through preamplifier 18 and transmits all data and subcode to CD-ROM drive controller 20. The CD-ROM drive controller performs EDC & ECC operations on each sector of data, and then retransmits all validated data to a host computer (not shown) via IDE bus 22.

Figure 2:
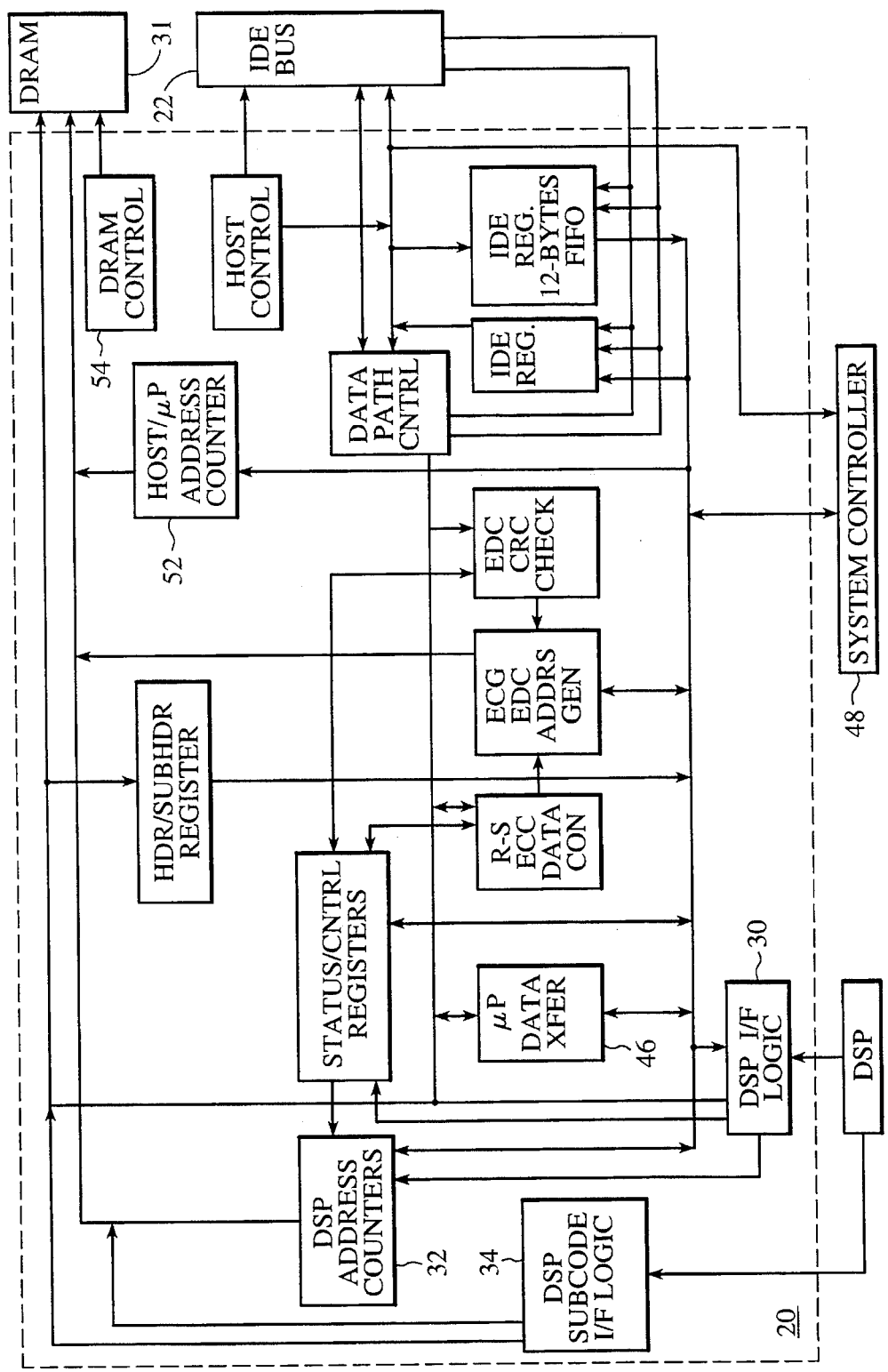
FIG. 2 shows a functional block diagram of a CD drive controller connected to associated electronic circuitry for implementing the method of the present invention

FIG. 2 is a schematic representation of the CD-ROM drive controller 20. It is in the method of operation of the CD-ROM drive controller that a preferred embodiment of the method of the present invention is applied.

DSP serial data is input to the CD-ROM drive controller by means of DSP interface (I/F) logic 30. This data is read in byte format, and is written into an external DRAM 31. Processing the serial data, and writing the data in byte format to the DRAM is the function of the DSP I/F logic, DSP address counters 32 and DSP subcode I/F logic 34.

Consider the case of a sector of data encoded in Yellow Book Mode 2 format. A complete sector of 2352 bytes would consist of 2048 user data bytes and 304 auxiliary data bytes. The auxiliary bytes include sync, header, blank, EDC and ECC bytes. The method of the present invention separates the user data bytes and the auxiliary data bytes into two blocks and store each block into non-contiguous and pre-designated address spaces within the external DRAM. For example, the user data space might consist of 2048 byte-length parses beginning at address 0 of the DRAM. These parses would be contiguous, and the number of blocks and sectors that could be stored simultaneously would depend upon the physical capacity of the DRAM.

The auxiliary data bytes would be stored in a separate, predesignated address space consisting of 512 byte sections per sector stored. Each auxiliary data block would be associated with its original corresponding user data block. The order of placement of the blocks within their separate address spaces could be used as a simple and expedient marker to insure that the associated blocks are processed in accordance with the EDC, ECC and additional operations.

Figure 3:
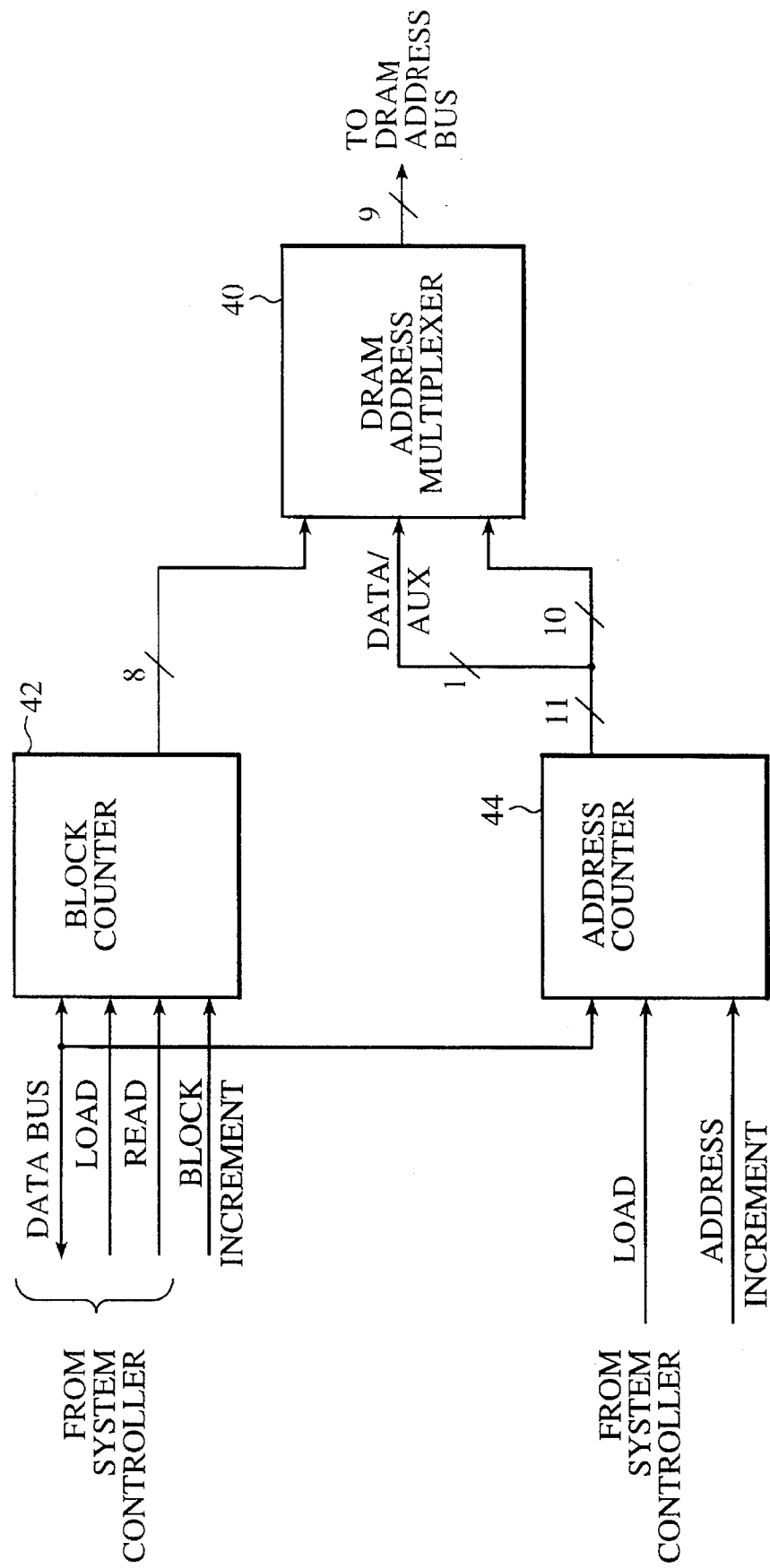
FIG. 3 shows a typical block counter & address counter circuit.
Figure 4:
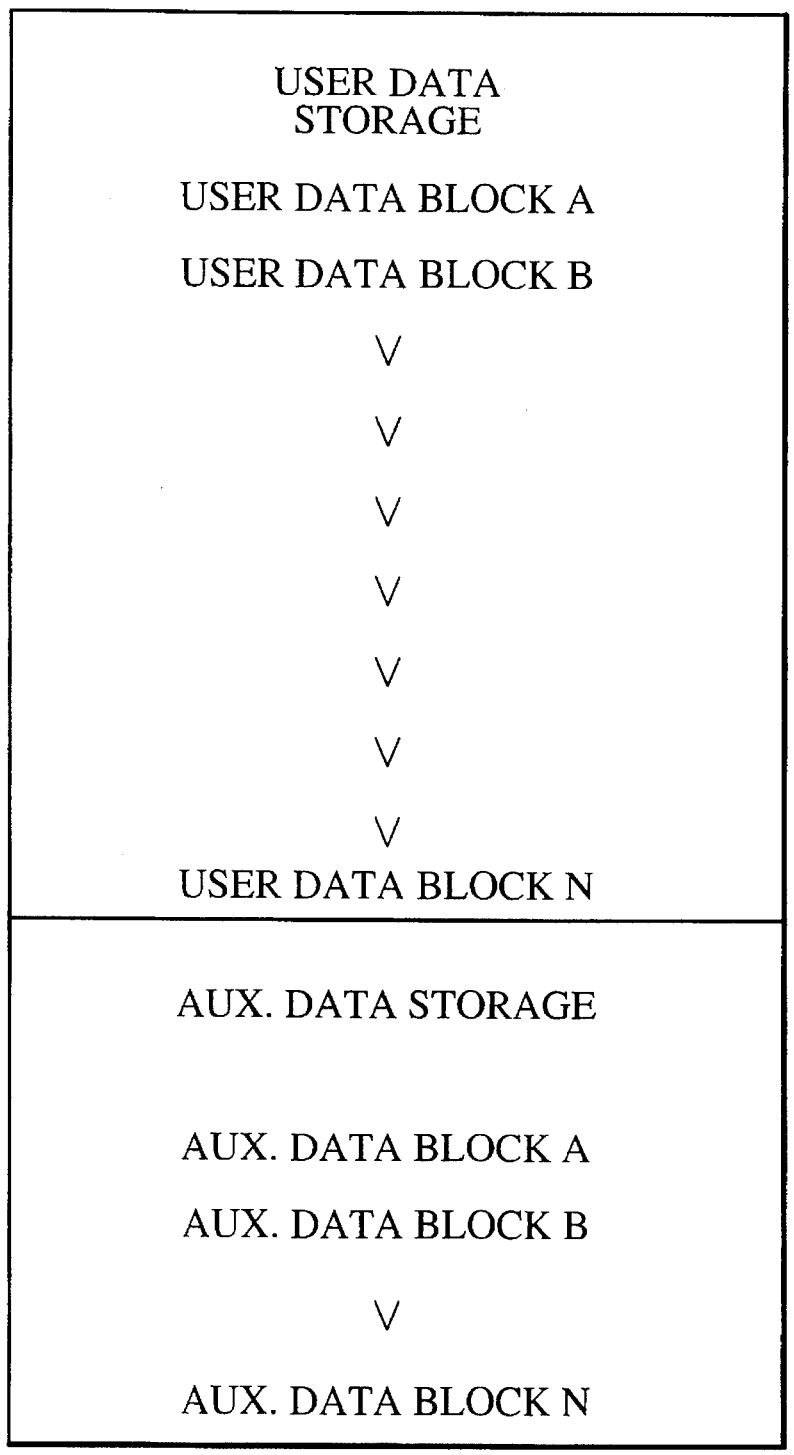
FIG. 4 is a of DRAM device with address spaces segmented in accordance with a preferred embodiment of the method of the present invention.

Referring now to FIG. 2 and FIG. 3, block counter 42 address counter 44 circuits are shown in FIG. 3. The block counter and address counter circuits generate block numbers and address counts, respectively. Address generation is accomplished with block counter 42 of eight binary bits, and address counter 44. Error correction can be performed on a user data block after a complete sector of data has been read into the DRAM. This is accomplished by reading the user data and the associated ECC and EDC bytes from the DRAM and processing them through ECC/EDC logic 46. If an error is detected in the user data, the erroneous data is corrected and written back into the DRAM.

The DRAM address generation is accomplished using the address sequence logic circuit, as shown in FIG. 3. An 11 bit signal from the address counter consists of a 10 bit address and a 1 bit switch indicating the nature of the addressed data. An 8 bit block counter is used. The data from the block counter 42 and address counter 44 is transmitted to a DRAM address multiplexer 40, for determining the address that the data is to be written into.

Additional subcode data is read by the CD-ROM drive controller by means of a signal pathway that is simultaneously communicating in parallel with data transfers from the DSP. Subcode data is written into the DRAM in the designated auxiliary data address space.

An interrupt is sent to the system controller 48 after an entire block of user data has been corrected if necessary and verified. The system controller then reads the block counter and saves the block number. These saved block numbers are used to locate the starting memory address of verified user data blocks, and to initiate the transfer of user data from the DRAM to a host computer by means of the CD-ROM drive controller 20 and via the IDE bus 22.

The transfer of a block of user data from the DRAM to the host computer is initiated by the system controller writing the appropriate block number to host address Counters 52 (FIG. 2).

The individual communications processes and data processing operations described above must occur simultaneously in order for the CD-ROM drive controller to support efficient data transfer rates. These parallel operations can be made possible by means of separate addressing logic circuitry (block counters and address counters), as shown in FIG. 3, for each function. DRAM control 54 of FIG. 2 comprises a time-multiplexed address and data bus which provides access for the dedicated addressing logic circuit of each function to DRAM.

In an alternate embodiment of the method of the present invention, the DRAM address space segmented for use in storing auxiliary data is limited to holding only two separate auxiliary data blocks. The DSP function and EDC/ECC functions are performed in parallel, with the ECC/EDC being performed on the user data block which has most recently been completely transferred into the DRAM by the DSP.

As an auxiliary data block is of no further use after the corresponding user data block has been processed through EDC/ECC logic, it is feasible to limit the DRAM address space dedicated to auxiliary data storage. It is only necessary to allocate space in the DRAM for two auxiliary data blocks; one block would receive incoming auxiliary data from the DSP, and the other block would be available for EDC/ECC logic operations on the last completed block of user data. Thus, by reducing the portion of the DRAM reserved for auxiliary data storage, the effective DRAM capacity available for storage of user data is increased.

Figure 5:
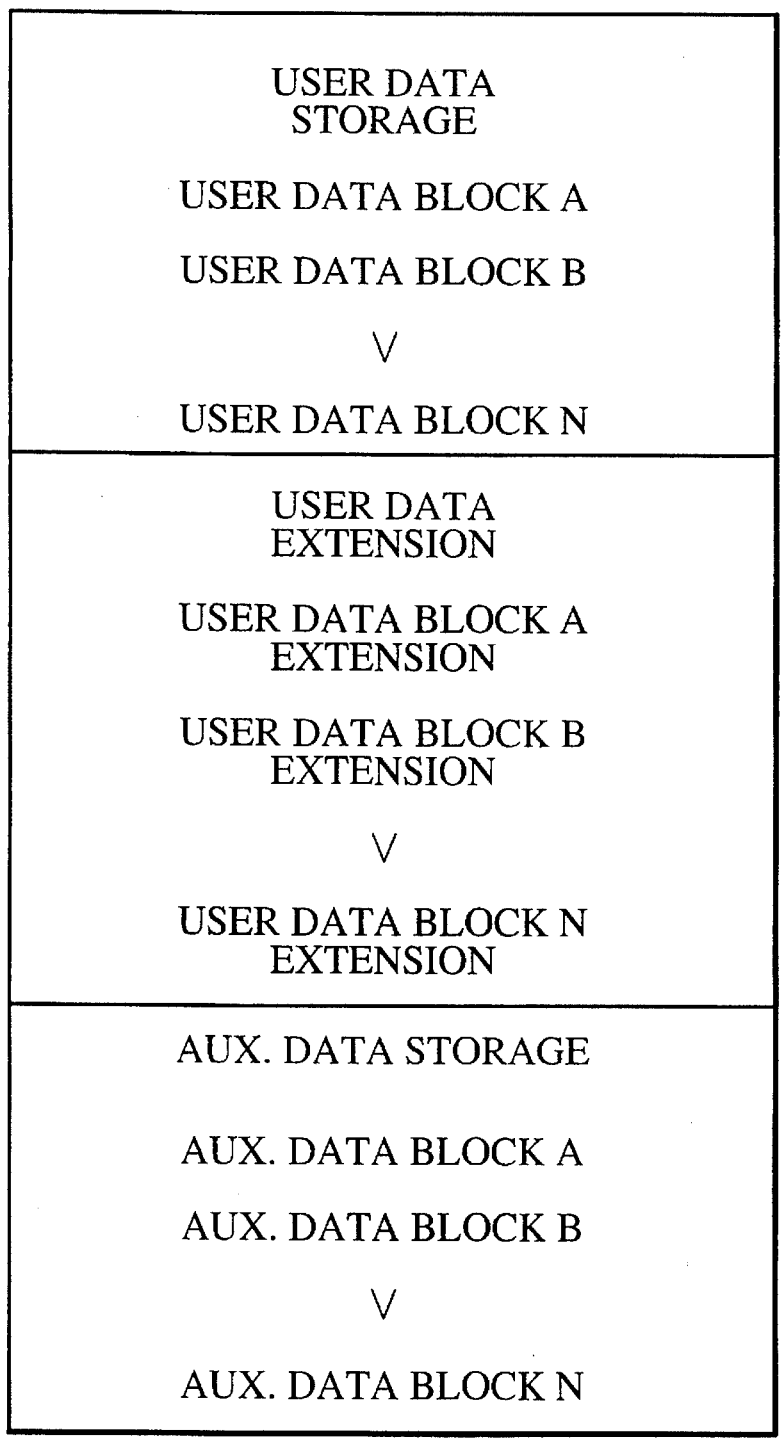
FIG. 5 is a block diagram of a DRAM device with address spaces segmented in accordance with an alternate preferred embodiment of the method of the present invention.

FIG. 5 illustrates a DRAM device with alternate designated address space allocations. This pattern would be used in an alternate preferred embodiment of the method of the present invention, wherein the addresses spaces reserved for individual user data block storage are not of sufficient length to store all possible user data depths. Consider a preferred embodiment wherein 2048 bytes of address space are available for each block of user data received. As Yellow Book Mode 2 includes 2336 bytes of user data, the user data extension address space would be used to store the additional 288 bytes of user data.

What is claimed is:

1. A method for communicating formatted data from a mass storage device to a host computer comprising the steps of:

sequentially receiving a multiplicity of formatted data sectors front the mass storage device, each of the formatted data sectors comprising a user data section and an auxiliary data section, the auxiliary data section including an EDC data field and an ECC data field;

defining a user data storage area and a separate auxiliary data storage area within a memory means;

defining the user data storage area to comprise a multiplicity of sequentially organized user data storage blocks, each of the user data storage blocks for storing a user data section;

defining the auxiliary data storage area to comprise a plurality of sequentially organized auxiliary data storage blocks, each of the auxiliary data storage blocks for storing an auxiliary data section;

sequentially separating each of the multiplicity of formatted data sectors into a user data section and an auxiliary data section;

sequentially storing each of the user data sections in the user data storage blocks, such that a first one of the user data sections is stored in a first one of the first user data storage blocks and each subsequent user data section is stored in each subsequent user data storage block;

sequentially storing each of the auxiliary data sections in the auxiliary data storage blocks, such that a first one of the auxiliary data sections is stored in a first one of the auxiliary data storage blocks and each subsequent auxiliary data section is stored in each subsequent auxiliary data storage block;

generating a multiplicity of sequential block numbers, such that a first one of the block numbers indicates the starting address of the first user data storage block, and each subsequent block number indicates the starting address of each subsequent user data storage block;

sequentially transmitting predetermined block numbers of the multiplicity of sequential block numbers to the host computer;

sequentially performing error detection and error correction operations on each of the user data sections, the error detection and error correction operations comprising the steps of;
(a) reading the EDC data field and the ECC data field of the auxiliary data section stored in the first auxiliary data block and transmitting the data to an EDC and ECC circuit;
(b) reading the user data section stored the first user data storage block and transmitting the data section to the EDC and ECC circuit;
(c) performing EDC and ECC operations on the user data section using the EDC data and ECC data from the auxiliary data section to provide error corrected user data;
(d) writing the error corrected user data to the first user data storage block;
(e) reading the EDC data field and the ECC data field of the auxiliary data section stored in a subsequent auxiliary data block and transmitting the data to the EDC and ECC circuit;
(f) reading the user data section stored in a subsequent user data storage block and transmitting the data section to the EDC and ECC circuit;
(g) performing EDC and ECC operations on the subsequent user data section using the EDC data and ECC data from the subsequent auxiliary data section to provide error corrected user data;
(h) writing the error corrected user data to the subsequent user data storage block; and
(i) repeating steps e to h for each subsequent user data section until each subsequent user data section has been error corrected and written to its user data storage block;

when requested by the host computer, communicating the first block number to the host computer for transmitting a predetermined portion of the user data section stored in the first user data storage block to the host computer; and when requested by the host computer, communicating subsequent block numbers to the host computer for transmitting a predetermined portion of subsequent user data sections stored in subsequent user data storage blocks to the host computer, whereby, when requested by the host computer, each subsequent block number is transmitted to the host computer for transmitting a predetermined portion of each subsequent user data section stored in each subsequent user data storage block to the host computer for transmitting user data to the host computer.

2. The method of claim 1 wherein:

a first predetermined quantity of the multiplicity of formatted data sectors are each sequentially separated into a user data section and an auxiliary data section;

each of the user data sections of the first predetermined quantity are each sequentially stored in the user data storage blocks, such that a first one of the user data sections is stored in the first user data storage block and each subsequent user data section is stored in each subsequent user data storage block; and each of the auxiliary data sections of the first predetermined quantity are each sequentially stored in the auxiliary data storage blocks, such that a first one of the auxiliary data sections is stored in a first one of the auxiliary data storage blocks and each subsequent auxiliary data section is stored in each subsequent auxiliary data storage block.

3. The method of claim 2, further comprising the steps of:
(a) sequentially separating each of a subsequent predetermined quantity of the multiplicity of formatted data sectors into a user data section and an auxiliary data section;
(b) sequentially storing each of the user data sections of the subsequent predetermined quantity in subsequent user data storage blocks;
(c) sequentially storing each of the auxiliary data sections of the subsequent predetermined quantity in subsequent auxiliary data storage blocks;
(d) sequentially performing error detection and error correction operations on each of the user data sections of the subsequent predetermined quantity until each subsequent user data section has been error corrected; and
(e) repeating steps a to d for each subsequent predetermined quantity of the multiplicity of formatted data sectors until each of the multiplicity formatted data sectors has been error corrected so that each user data section is suitable for transmission to the host computer.

4. A method for communicating formatted data from a mass storage device to a host computer comprising the following steps:
(a) sequentially receiving a multiplicity of formatted data sectors from the mass storage device, each of the formatted data sectors comprising a user data section and an auxiliary data section, the auxiliary data section further comprising at least an EDC data field and an ECC data field;
(b) defining a user data storage area and an auxiliary data storage area within a memory device;
(c) defining the user data storage area to comprise a multiplicity of user data storage blocks, each of the user data storage blocks for storing a user data section, the multiplicity of user data storage blocks organized sequentially in the user data storage area, each of the multiplicity of user data storage blocks further comprising a first user data storage block;
(d) defining the auxiliary data storage area to comprise a multiplicity of auxiliary data storage blocks, each of the auxiliary data storage blocks for storing an auxiliary data section, the multiplicity of auxiliary data storage blocks organized sequentially in the auxiliary data storage area, each of the multiplicity of auxiliary data storage blocks further comprising a first auxiliary storage block;
(e) sequentially separating each of the multiplicity of formatted data sectors into a user data section and an auxiliary data section;
(f) storing each of the multiplicity of user data sections in the sequentially organized user data storage blocks;

(g) storing each of the multiplicity of the auxiliary data sections in the sequentially organized auxiliary data storage blocks;

(h) transmitting the EDC data field and the ECC data field of the auxiliary data section from the first auxiliary data block to an EDC and ECC circuit;

(i) transmitting the user data section from the first user storage data block to the EDC and ECC circuit;

(j) performing EDC and ECC operations on the user data section ion using the EDC data and ECC data from the auxiliary data section to provide error corrected use data;

(k) transmitting the error corrected user data to the first user data storage block;

(l) generating a first block number the first block number indicating the starting address of the first user data storage block;

(m) transmitting the first block number to the host computer; and (n) when requested by the host computer, communicating the first block number to the host computer for transmitting the data in the first user data storage block to the host computer.

5. The method of claim 4 comprising further the steps of:

generating a multiplicity of sequential block numbers, such that the first block number indicates the starting address of the first user data storage block, and each subsequent block number indicates the starting address of each subsequent user data storage block;

sequentially transmitting predetermined block numbers of the multiplicity of sequential block numbers to the host computer; and sequentially performing error detection and error correction operations on each of the user data sections.

6. A method for communicating formatted data from a mass storage device to a host computer comprising the steps of:

(a) sequentially receiving a multiplicity of formatted data sectors from the mass storage device, each of the formatted data sectors comprising a user data section and an auxiliary data section, the auxiliary data section including an EDC data field and an ECC data field;

(b) defining a user data storage area and a separate and distinct auxiliary data storage area within a memory device;

(c) defining the user data storage area to comprise a multiplicity of sequentially organized user data storage blocks, each of the user data storage blocks for storing a user data section;

(d) defining the auxiliary data storage area to comprise a plurality of sequentially organized auxiliary data storage blocks, each of the auxiliary data storage blocks for storing an auxiliary data section;

(e) sequentially separating each of a first predetermined quantity of the multiplicity of formatted data sectors into a user data section and an auxiliary data section;

(f) sequentially storing each of the user data sections of the first predetermined quantity in the user data storage blocks, such that a first one of the user data sections is stored in a first one of the user data storage blocks and each subsequent user data section is stored in each subsequent user data storage block;

(g) sequentially storing each of the auxiliary data sections of the first predetermined quantity in the auxiliary data storage blocks, such that a first one of the auxiliary data sections is stored in a first one of the auxiliary data storage blocks and each subsequent auxiliary data section is stored in each subsequent auxiliary data storage block;

(h) generating a multiplicity of sequential block numbers, such that a first one of the block numbers indicates the starting address of the first user data storage block and each subsequent block number indicates the starting address of each subsequent user data storage block;

(i) sequentially transmitting predetermined block numbers of the multiplicity of sequential block numbers to the host computer;

(j) sequentially performing error detection and error correction operations on each of the user data sections of the first predetermined quantity, the error detection and error correction operations comprising the steps of;

(k) reading the EDC data field and the ECC data field of the auxiliary data section stored in the first auxiliary data block and transmitting the data to an EDC and ECC circuit;

(l) reading the user data section stored the first user data storage block and transmitting the data section to the EDC and ECC circuit;

(m) performing EDC and ECC operations on the user data section using the EDC data and ECC data from the auxiliary data section to provide error corrected user data;

(n) writing the error corrected user data to the first user data storage block;

(o) reading the EDC data field and the ECC data field of the auxiliary data section stored in a subsequent auxiliary data block and transmitting the data to the EDC and ECC circuit;

(p) reading the user data section stored in a subsequent user data storage block and transmitting the data section to the EDC and ECC circuit;

(q) performing EDC and ECC operations on the subsequent user data section using the EDC data and ECC data from the subsequent auxiliary data section to provide error corrected user data;

(r) writing the error corrected user data to the subsequent user data storage block;

(s) repeating steps o to r for each subsequent user data section of the predetermined quantity until each subsequent user data section has been error corrected and stored in its user data storage block; (t) sequentially separating each of a subsequent predetermined quantity of the multiplicity of formatted data sectors into a user data section and an auxiliary data section;

(u) sequentially storing each of the user data sections of the subsequent predetermined quantity in subsequent user data storage blocks;

(v) sequentially storing each of the auxiliary data sections of the subsequent predetermined quantity in subsequent auxiliary data storage blocks;

(w) sequentially performing error detection and error correction operations on each of the user data sections of the subsequent predetermined quantity by repeating steps o to r for each subsequent user data section until each subsequent user data section has been error corrected;

(x) repeating steps t to w for each subsequent predetermined quantity of the multiplicity of formatted data sectors until each of the multiplicity formatted data sectors has been addressed and error corrected so that each user data section is suitable for transmission to the host computer;

(y) when requested by the host computer, communicating the first block number to the host computer for transmitting a predetermined portion of the error corrected user data section stored in the first user data storage block to the host computer; and (z) when requested by the host computer, communicating the subsequent block number to the host computer for transmitting a predetermined portion of the subsequent error corrected user data section stored in the subsequent user data storage block to the host computer, whereby, when requested by the host computer, each subsequent block number is transmitted to the host computer for transmitting a predetermined portion of each subsequent error corrected user data section stored in each subsequent user data storage block to the host computer for transmitting error corrected user data to the host computer.

7. The method of claim 6 wherein the auxiliary data storage area within the memory device is defined to comprise up to two sequentially organized auxiliary data storage blocks for substantially limiting the storage area of the memory device dedicated to storing auxiliary data and for increasing storage area dedicated to storing user data sections; and the first predetermined quantity and each of the subsequent predetermined quantities of the multiplicity of formatted data sectors are no greater than two formatted data sectors.

8. A controller for serial communication of sectors of formatted data from a mass storage device to a host computer, the host computer having a separate system controller, digital signal processor, memory means, and a communication bus, the formatted data consisting of a user data section and an auxiliary data section in a predetermined format, the auxiliary data section including data selected from the group consisting of sync, header, blank, EDC, and ECC data, the controller comprising:

a digital signal processor interface comprising digital signal processor logic circuitry, the interface for receiving sectors of formatted data from the mass storage device in a predetermined byte format, separating the formatted data into user data sections and auxiliary data sections, storing the user data sections into an area in the memory means comprising contiguous user data storage blocks, and storing the auxiliary data sections into a separate and distinct area in the memory means comprising contiguous auxiliary data storage blocks;

error detection and correction circuitry for detecting and correcting any errors in the user data sections, the error detection and correction circuitry performing data error detection and correction operations on the user data sections using error detection and correction data provided in the auxiliary data sections, the error detection and correction circuitry operating in parallel with the digital signal processor interface; and a block counter and address counter circuit, the block counter and address counter circuit generating block numbers and address counts using address sequence logic, whereby upon an interrupt signal being received by the system controller and after the user data sections from an entire sector of formatted data have been error detected and corrected to verify that the user data is free from errors, the system controller reads the block counter and saves the block number to the memory means, each block number indicating the starting memory address of a user data storage block, the block numbers being used to initiate the transfer of error corrected user data sections from the memory means to the host computer via the communications bus, and whereby all of the user data sections from any given sector of formatted data are error detected and error corrected and stored into the contiguous user data storage blocks of the memory means, with the block numbers being continuously generated and saved to the memory means so that the block numbers can be used to initiate the transfer of error corrected user data sections from the memory means to the host computer.

9. The controller of claim 8 wherein no more than two auxiliary data storage blocks are provided in the memory means for storing auxiliary data sections for substantially limiting the storage area of the memory means dedicated to storing auxiliary data and for increasing storage area of the memory means dedicated to storing user data sections.

\* \* \* \* \*